(12) United States Patent
Sakai et al.

(10) Patent No.: US 7,409,591 B2
(45) Date of Patent: Aug. 5, 2008

(54) METHOD AND SYSTEM FOR MANAGING PROGRAMS FOR WEB SERVICE SYSTEM

(75) Inventors: Nobuyoshi Sakai, Yokohama (JP); Atsushi Otake, Yokohama (JP); Jun Sugihara, Yokohama (JP)

(73) Assignee: Hitachi, Ltd, Tokyo (JP)

( * ) Notice: Subject to any disclaimer, the term of this patent is extended or adjusted under 35 U.S.C. 154(b) by 667 days.

(21) Appl. No.: 10/858,379

(22) Filed: Jun. 2, 2004

(65) Prior Publication Data

US 2005/0010669 A1    Jan. 13, 2005

(30) Foreign Application Priority Data

Jun. 2, 2003    (JP)    ............... 2003-156783

(51) Int. Cl.
*G06F 11/00*    (2006.01)
(52) U.S. Cl. .............. 714/25; 714/27; 714/33; 714/38; 714/47; 714/49
(58) Field of Classification Search .......... 714/25, 714/27, 33, 38, 47, 49, 18, 19
See application file for complete search history.

(56) References Cited

U.S. PATENT DOCUMENTS

| 7,086,066 | B2 * | 8/2006 | Kappel et al. ............. 714/38 |
| 7,200,779 | B1 * | 4/2007 | Coss et al. ............... 714/48 |
| 2003/0182624 | A1 * | 9/2003 | Large ................. 715/513 |
| 2004/0221017 | A1 * | 11/2004 | Yoon ................. 709/217 |
| 2004/0221292 | A1 * | 11/2004 | Chiang et al. ............. 719/310 |

OTHER PUBLICATIONS

U.S. Appl. No. 10/715,121 filed Nov. 18, 2003, "Entitled: Program Changing Method".
U.S. Application No. (not yet assigned) filed Jun. 2, 2004, "Entitled: Method and System For Mananging Programs For Web Service System".
"Java Web Services", David A. Cbappell et al. O'Reilly & Associates, Inc., Mar. 2002, pp. 25-53, pp. 73-95, pp. 98-139.

* cited by examiner

*Primary Examiner*—Robert W Beausoliel, Jr.
*Assistant Examiner*—Joseph D Manoskey
(74) *Attorney, Agent, or Firm*—Antonelli, Terry, Stout & Kraus, LLP.

(57) ABSTRACT

A program managing method in a web service system for providing a web service for testing a message which has been changed in response to a change made in interface definition information comprises steps for judging as to whether or not an error occurs when an access request made by a message is transmitted, which is caused by the change of the interface definition information indicative of an interface of a destination of the access request; changing the message in correspondence with a content of the changed interface definition information in the case that the error occurs which is caused by the change of the interface definition information; and transmitting an access request made by the changed message in a test mode. It then becomes possible to correct and test the program in a dynamic manner for preventing recurrence of this error.

12 Claims, 8 Drawing Sheets

METHOD AND SYSTEM FOR MANAGING PROGRAMS FOR WEB SERVICE SYSTEM

CROSS-REFERENCE TO RELATED APPLICATIONS

This invention relates to both a patent application Ser. No. 10/715,121 entitled PROGRAM CHANGING METHOD filed by Atsushi OTAKE on Nov. 18, 2003 claiming priority under 35 USC Section 119 of Japanese Patent Application No. 2003-057936 and a Patent Application to be filed by Jun Sugihara et al. claiming priority under 35 USC Section 119 of Japanese Patent Application No. 2003-158755. The present application claims priority from Japanese Application JP 2003-156783 filed on Jun. 2, 2003, the content of which is hereby incorporated by reference into this application.

BACKGROUND OF THE INVENTION

The present invention is related to a program managing apparatus capable of managing changes in programs, or objects, and also capable of performing a test as to the program, or object changes.

Very recently, a specific attention has been paid to web services corresponding to distributed object techniques using the Internet, while the web services are such functions realized by executing programs and objects. As a basic technical idea with respect to the above-described web services, SOAP (Simple Object Access Protocol), WSDL (Web Service Description Language), UDDI (Universal Description Discovery, and Integration) are provided. This basic technique is disclosed in, for instance, "Java Web Services" written by David A. Cbappell et al., O'Reilly & Associates, Incorporated publisher, in March, 2002, pages 25 to 53, 72 to 95, and 98 to 139.

While "SOAP" is a definition of an envelope structure which is used to exchange structural documents, a structural document described in accordance with this definition is referred to as a "SOAP message", and in a client/server program using a web service, a communication operation is carried out by employing this SOAP message.

WSDL corresponds to a structural document format used to define an interface of a web service. In such a web service, while a WSDL file is used as an interface, a communication operation is carried out by employing a SOAP message.

While UDDI provides both a global registry and a standardized specification with respect to a web service, this UDDI is opened as a registry which can be commonly utilized on the Internet. As a consequence, in such a client/server program with employment of a web service, while a web service of a server program is registered in this UDDI registry, a client program finds out the web service which has been registered in the UDDI registry, so that the client program can utilize the web service of the server program.

SUMMARY OF THE INVENTION

A consideration is made of such a case that interface definition information of a destination of an access request has been changed in the distributed technique. It is so assumed that a maintenance operator may grasp that a reason why a client program accepts an error message is caused by such a change made in the interface definition information, and thus, corrects the client program based upon this changed interface definition information.

When the above-described maintenance operation as to the client program is carried out, the maintenance operator confirms as to whether or not a transmitted message which causes an occurrence of an error corresponds to such a message which has been formed in accordance with the interface definition information before correction. In such a case that the produced message has been formed in a correct manner in accordance with the interface definition information before correction, the maintenance operator acquires such an interface definition information after correction, and then corrects the client program in such a manner that a message made in accordance with the interface definition information after correction is transmitted.

However, the production of the client program in accordance with the conventional method is merely realized by producing such a client program based upon the interface definition information and the models. As a consequence, the maintenance operator must necessarily perform such a cumbersome work. That is, even when the maintenance operator can grasp that the error occurred in the client program under execution corresponds to such an error which is caused by changing the interface definition information, this maintenance operator once stops the execution of this client program, acquires the interface definition information after correction, and again forms a model of the client program based upon the acquired interface definition information. Then, the maintenance operator executes the program maintenance work, while judging the correspondence relationship between the changed portions of the interface definition information and the corrected portions of the client program.

Furthermore, after the maintenance operator has changed/corrected the client program, the maintenance operator is required to test this changed/corrected client program before the actual operation thereof is commenced. Then, the maintenance operator must further correct this client program, if required.

An object of the present invention is to solve the above-described problem, and therefore, is to provide such a technical idea. That is, in such a case that an error occurs which is caused by changing the interface definition information, a correcting operation and a test operation can be carried in a dynamic manner, which are required so as to prevent recurring of this error.

The present invention is featured by that in such a program managing method in a web service system for providing a web service for testing a program which has been changed in response to a change made in interface definition information, either a message or a program is changed in the case that an error occurs which is caused by the change of the interface definition information, and then, an access request is transmitted in a test mode.

In the program managing apparatus (computer, information processing apparatus, or program and object, which execute such a process operation) of the present invention, the program managing apparatus executes such a process operation that an access request made by a SOAP message is transmitted to a web service server which provides a web service (function realized by executing program, or object) so as to receive a provision of the web service.

While the access request made by the SOAP message is transmitted, the program managing apparatus judges as to whether or not an error caused by a change made in interface definition information happens to occur, namely such an error happens to occur which is caused by changing a WSDL file. The interface definition information indicates such an interface related to data and operations, which are executed between a web service program of a destination of this access request and the own program apparatus. In such a case that the error occurs which is caused by changing the WSDL file, the program managing apparatus compares a WSDL file before correction with a WSDL file after correction so as to investigate a changed portion.

Then, the program managing apparatus changes the SOAP message in correspondence with this changed portion, and then, transmits an access request which is produced by the changed SOAP message with respect to a web service server in a test mode. In the case that an error does not occur in this test transmission, when an access request is subsequently sent to the web service server, the program managing apparatus performs such an operation that the SOAP message is changed to be transmitted in a manner similar to the above-explained manner.

Alternatively, the program managing apparatus may correct a client program used to issue an access request in correspondence with the changed portion, and then, may transmit an access request made by the changed client program to the web service server in a test mode. In such a case that an error does not occur in this test transmission, the program managing apparatus performs such an operation that the client program before correction is stopped, the client program after correction is executed, and subsequently, the operation is carried out based upon the client program after correction.

In this connection, in such a case that access requests are issued to a plurality of web service servers, in such a case that the error occurs in the above-described test transmission, the program managing apparatus may alternatively correct either the SOAP message or the client program in such a way that the program managing apparatus changes only a SOAP message sent to such a web service server that the error occurs among the SOAP messages to be transmitted to the respective web service servers.

As previously explained, in accordance with the program managing apparatus of the present invention, in such a case that the error occurs which is caused by changing the interface definition information, the correcting operation and the test operation can be carried in a dynamic manner, which are required so as to prevent recurring of this error.

DESCRIPTION OF THE EMBODIMENTS (Embodiment 1)

A description is made of a program managing apparatus, according to an embodiment 1 of the present invention, which may test a message which has been changed in response to a change of interface definition information.

Figure 1:
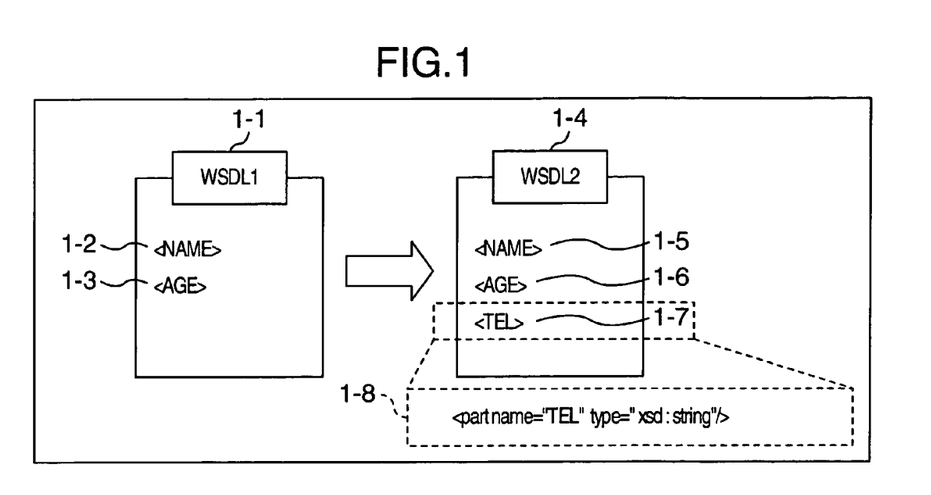
FIG. 1 is a diagram for illustratively showing a changing example as to a WSDL file according to an embodiment 1 of the present invention.

FIG. 1 is a diagram for illustratively indicating a changing example as to a WSDL file of this embodiment 1. As indicated in FIG. 1, in such a case that storage place information of WSDL (Web Services Description Language) 1 (1-1) is changed into storage place information WSDL2 (1-4) while the WSDL1 (1-1) indicates a interface of a web service (namely, function which is realized by executing program, or object), namely, in WSDL1 obtained before a correction is made, inputs of only a name and an age are accepted. In the web service after the correction is made, in such a case that inputs of a telephone number in addition to the name and the age are accepted, as represented in FIG. 1, WSDL1 of only <NAME> and <AGE> tags (1-2, 1-3) is changed into WSDL2 of <NAME>, <AGE>, <TEL> tags (1-5, 1-6, 1-7). Concretely speaking, a column of "1-8" is additionally provided.

Figure 2:
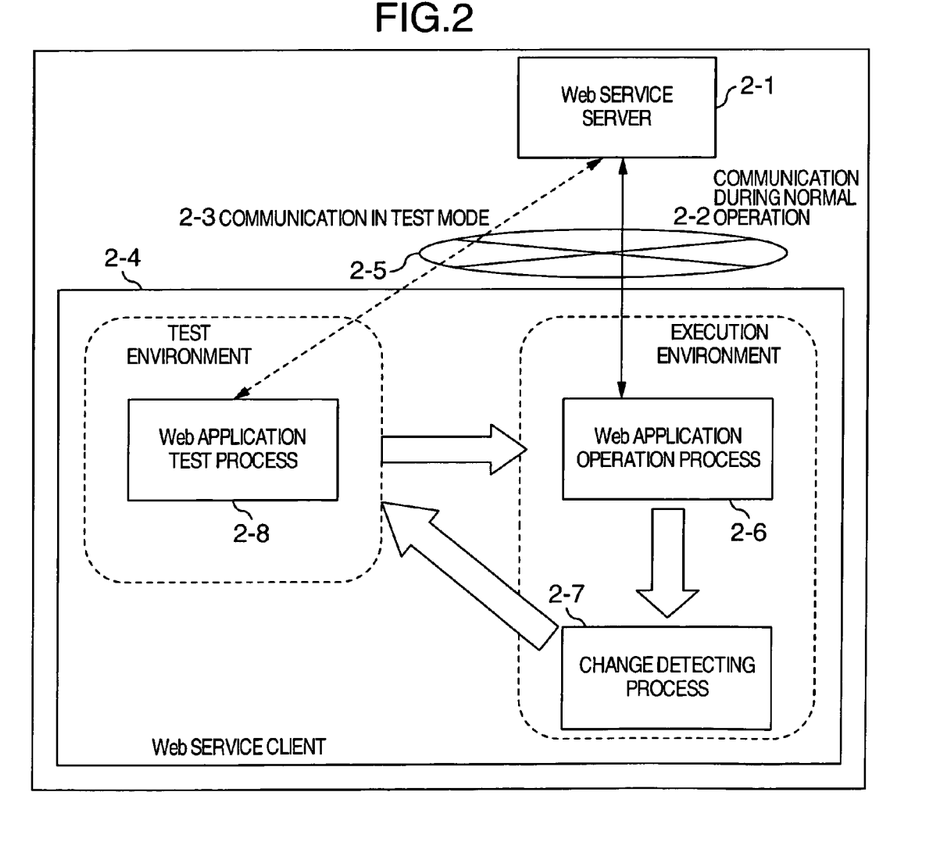
FIG. 2 is a diagram for schematically representing an outline of process operations of a program managing apparatus of the embodiment 1.

FIG. 2 is a diagram for schematically representing an outline of process operations of a program managing apparatus of the embodiment 1. It should be noted that although this embodiment 1 describes a program as a subject, this embodiment 1 may be alternatively applied also to an object.

As represented in FIG. 2, the normal operation is carried out by way of a SOAP message communication 2-2 between a web service server 2-1 and a web application operating process 2-6 on a web service client 2-4. It should also be understood that the client apparatus and the server apparatus shown this drawing may be alternatively substituted by either a computer and an information processing apparatus, or a program and an object which execute the above-explained process operations.

In this stage, in the web service server 2-1, in the case that WSDL corresponding to an interface of a web service is changed into the other WSDL as shown in FIG. 1, since an interface of a SOAP message transmitted from the web service client 2-4 is different from the present interface, this web service server 2-1 returns therefrom a fault message. In this case, a faultcode becomes "SOAP-ENV:Client."

When the web application operating process 2-6 provided on the side of the web service client 2-4 receives this fault message, a change in WSDL corresponding to the interface of the web service server 2-1 is sensed by a change sensing process 2-7 so as to specify a changed portion.

Next, a correction is made in the SOAP message, and then, the corrected SOAP message is transmitted in a test mode (2-5) by a web application test process 2-8. As a result of this test transmission, namely, since a response of the transmitted SOAP message is judged, such a process operation is carried out. That is to say, the operation 2-6 of the web application is restarted, or this operation 2-6 is stopped, so that a content of this error is notified to a manager.

Figure 3:
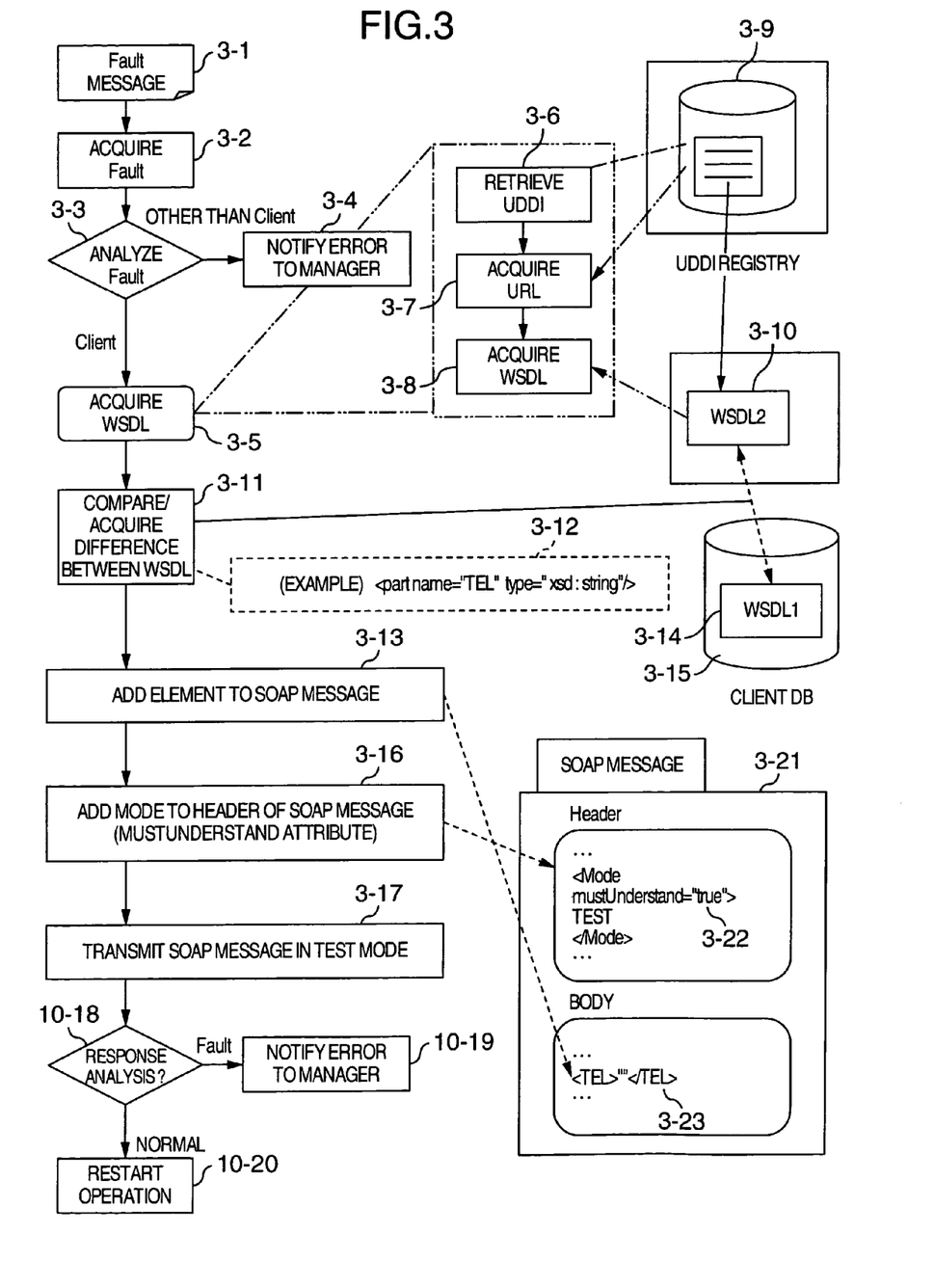
FIG. 3 is a diagram for indicating a detailed process operation executed on the side of a client program of the embodiment 1.

FIG. 3 is a diagram for illustratively representing a detailed process operation executed on the side of a client program of this embodiment 1. Referring now to a process flow chart of FIG. 3, the process operations executed on the side of the client program of this embodiment 1 will be described in detail.

When a web service client acquires a fault message 3-1 by a response sent from a web service server (3-2), the web service client firstly executes an analysis (3-3) of the fault message. In the analyzing operation of the fault message, the web service client checks as to whether a content of a faultcode tag corresponds to "SOAP-ENV:Client", or other contents. When the content of the faultcode tag corresponds to "SOAP-ENV:Client", the web service client acquires WSDL (3-5), whereas when the content of the faultcode tag corresponds to other contents, the web service client stops the operation of the web application, displays an error screen with respect to a user, and also, performs an error notification to a manager (3-4).

In an acquisition (3-5) of WSDL, a web service is retrieved (3-6) in a UDDI (Universal Description, Discovery, and Integration) registry 3-9 by employing a web service retrieve condition which has been previously stored in a client DB3-15 (3-6), and storage place information as to WSDL after correction is acquired (3-7). In an acquisition of WSDL, the web service client access a URL (Uniform Resource Locator) of the acquired storage place information so as to acquire the corrected WSDL.

In a WSDL comparing/difference acquisition (3-11), a WSDL2 (3-10) after correction which has been acquired is compared with a WSDL1 (3-14) before correction which has been stored in the client DB, and a difference between them is acquired. In the case of this embodiment 1, such a difference as indicated in an example 3-12 is acquired. The web service client discriminates a tag ("TEL" in this example) which will be added from the acquired difference, sets a null character string (" ") as this tag content (3-23), and then adds this tag to a BODY element of a SOAP message which has become an error (3-13). In this embodiment 1, it is so assumed that in order to correct the SOAP message when the error happens to occur, such a SOAP message which has been transmitted from the web service client to the web service server is temporarily stored in a memory.

Next, the SOAP message is transmitted in a test mode. This test-mode transmission of the SOAP message is carried out in the below-mentioned manner.

That is, a Mode tag is added to a Header of the SOAP message (3-16). In this case, an attribute of the Mode tag is set to a must understand attribute (3-22), and in such a case that the web service server cannot understand the Mode tag, it is so set that an error is returned by the web service. server. Also, it is so assumed that the content of the Mode tag is "TEST." In this embodiment 1, it is so assumed that the web service server also owns such a function capable of interpreting this Header; in the case that a content of a Mode tag corresponds to "TEST", the web service server is operated in the test mode, and checks as to whether or not a SOAP message transmitted from a client side corresponds to the normal input while does not execute an actual reservation and/or an actual order; and then, the web service server returns a response of a check result to the client.

Next, the changed SOAP message is transmitted to the web service server (3-17), and a response thereof is analyzed (3-18). In the case that the normal response is returned from the web service server, the web service client restarts the operation at once (3-20). Also, in the case that the fault message is returned from the web service server, the web service client notifies an error content to the manager, and stops the operation (3-19).

When the above-described operation is restarted, the web service client executes the following process operation. That is, after the web service client performs such a correction that a BODY element corresponding to the above-described difference is added, or deleted with respect to the SOAP message outputted from the web service client, the web server client sends this corrected SOAP message to the web service server.

Figure 4:
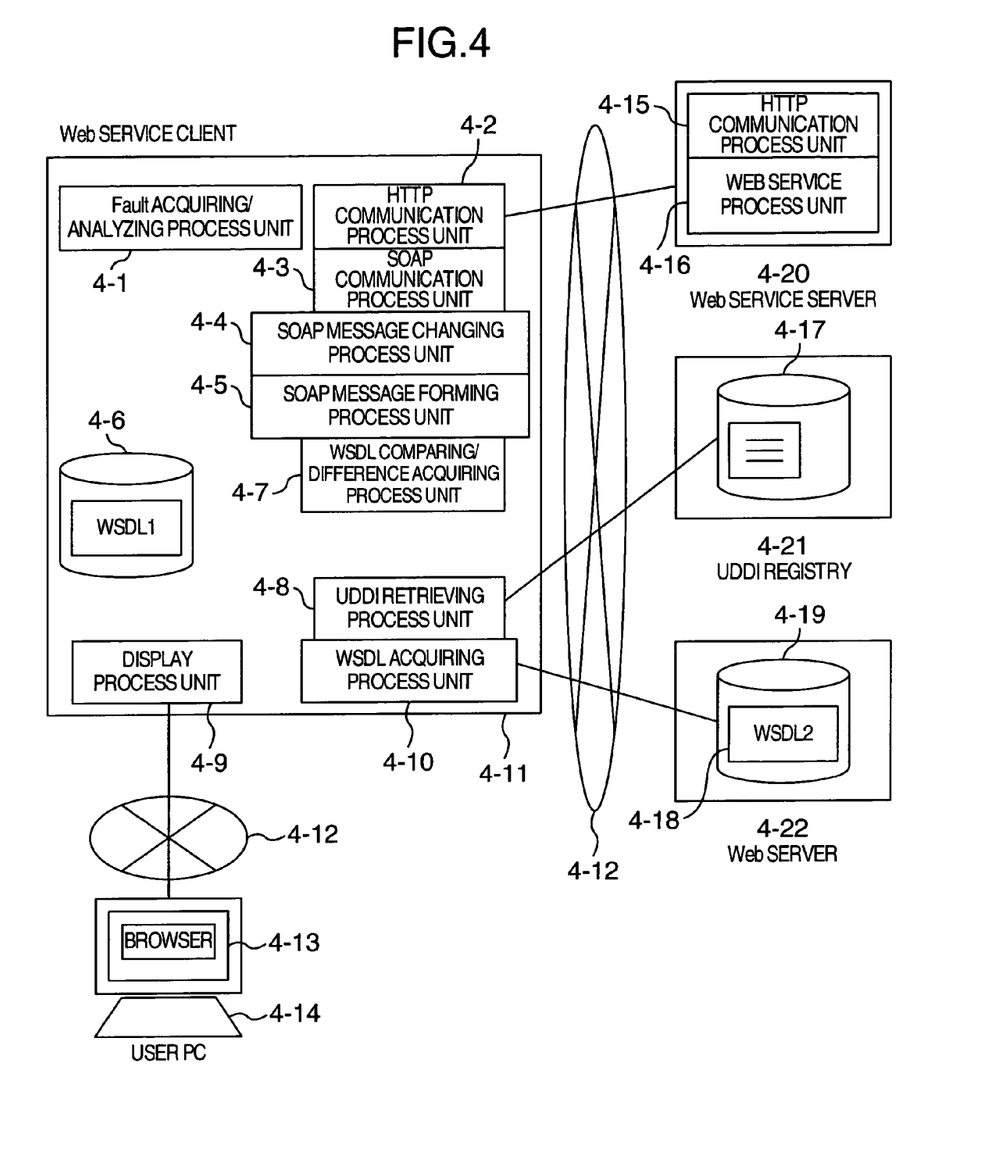
FIG. 4 is a diagram for schematically indicating a system structure of the program managing apparatus of the embodiment 1.

FIG. 4 is a diagram for schematically showing a system structure of the program managing apparatus according to this embodiment 1. Both the system structure and respective process operations will now be explained with reference to FIG. 4 and FIG. 3.

In FIG. 4, a web service client 4-11, a web service server 4-20, a UDDI registry 4-21, a web server 4-22, and a user PC 4-14 correspond to computers which are connected to a network 4-12.

Although the present invention does not specify a communication means between the server and the client, this embodiment 1 will now be explained based upon such an initial condition that a communication operation is carried out between the server and the client by employing the HTTP (Hyper Text Transfer Protocol) on. the Internet. In other words, it is so assumed that while the web service client 4-11 owns such a function as an HTTP server, the user PC 4-14 is communicated via a web browser 4-13 to the web service client 4-11.

Also, it is so assumed that while the web service server 4-20 owns a function as an HTTP server, this web service server 4-20 is communicated to the web service client 4-11 by using a SOAP message; and while the UDDI registry 4-21 is equipped with an HTTP server, this UDDI registry 4-21 is communicated to the web service client 4-11 by employing a SOAP message.

The web service client 4-11 holds a database 4-6 which stores thereinto WSDL before correction and WSDL after connection. Also, this web service client 4-11 holds an HTTP communication processing unit 4-2, a SOAP communication processing unit 4-3, a SOAP message changing process unit 4-4, a SOAP message forming process unit 4-5, a WSDL comparing/difference-acquiring process unit 4-7, a UDDI retrieving process unit 4-8, a WSDL acquiring process unit 4-10, a fault acquiring/analyzing process unit 4-1, and also, a display process unit 4-9 on a memory thereof.

It is so assumed that after such a program for causing the web service client 4-11 to function as the respective processing units is recorded on a recording medium such as a CD-ROM and is stored in a magnetic disk, this program is loaded to the memory so as to be executed. It should also be noted that the recording medium for recording thereon the above-explained program may be alternatively realized by any recording medium other than this CD-ROM. Alternatively, the above-described program may be installed from this recording medium into the information processing apparatus, and the web service client 4-11 may access via a network to this recording medium so as to use this program.

The HTTP communication processing unit 4-2 executes a communication operation in accordance with the HTTP protocol. The SOAP communication processing unit 4-3 transmits and receives a SOAP message containing a test mode (3-17). The fault acquiring/analyzing process unit 4-1 acquires a fault message (3-2) and analyzes a fault message (3-3). The SOAP message changing process unit 4-4 adds a BODY element of a SOAP message (3-13), and adds a Header element (3-16). The SOAP message forming process unit 4-5 receives via the display process unit 4-9, such a data which is entered from the browser of the user PC 4-14, and then forms a SOAP message. The WSDL comparing/difference-acquiring process unit 4-7 performs a comparing/difference-acquiring operation of WSDLs (3-11).

The UDDI retrieving process unit 4-8 executes a retrieving operation of the UDDI registry (3-6). The WSDL acquiring process unit 4-10 performs an acquiring operation of WSDL (3-5). The display processing unit 4-9 displays a web page on the browser of the user PC, and receives an input from the browser, and then supplies the received input to the SOAP message forming process unit 4-5.

Next, the web service server 4-20 holds an HTTP communication processing unit 4-15, and a web service processing unit 4-16 on a memory thereof. The HTTP communication processing unit 4-15 performs a communication operation based upon the HTTP protocol. The web service processing unit 4-16 receives a SOAP message sent from the web service client 4-11, and then provides a web service. The UDDI registry 4-21 holds such an information related to web services such as WSDL holding places in a DB 4-17. The web server 4-22 stores the information as to WSDL in another DB 4-19.

As previously described, in accordance with the program managing apparatus according to this embodiment 1, when the error happens to occur which is caused by that the interface definition information is changed, the SOAP message is changed in order to be adapted to the changed content of this interface definition information, and then, the access request is transmitted in the test mode. As a result, in such a case that the error occurs which is caused by changing the interface definition information, the correcting operation and the test operation can be carried in a dynamic manner, which are required so as to prevent recurring of this error.

(Embodiment 2)

A description is made of a program managing apparatus according to an embodiment mode 2 of the present invention, while the program managing apparatus tests such a program which has been changed in response to a change made in interface definition information.

Figure 5:
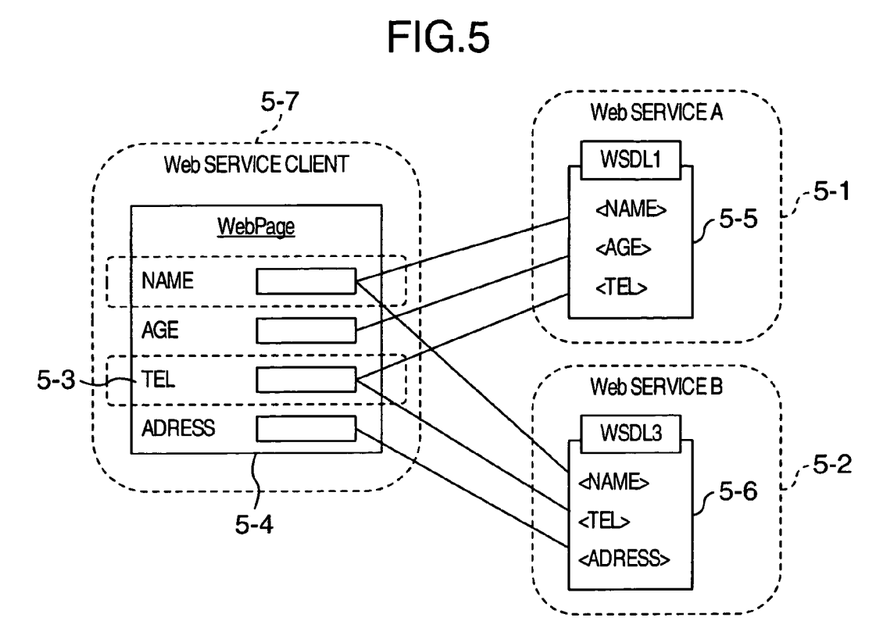
FIG. 5 is a diagram for illustratively showing an outline as to connections to a plurality of web services by a web service client according to an embodiment 2 of the present invention.

FIG. 5 is a diagram for illustratively showing an outline as to connections to a plurality of web services by a web service client according to this embodiment 2 of the present invention. As shown in FIG. 5, in such a case that the web service client contains access operations to a plurality of web service servers with respect to a single web page which is displayed for users, for example, in the case that a name, an age, and a telephone number are required for an order of a web service "A", whereas a name, an age, and an address are required for an order of a web service "B", both a form of the name and a form of the telephone number are utilized by both the web service "A" and the web service "B."

Figure 6:
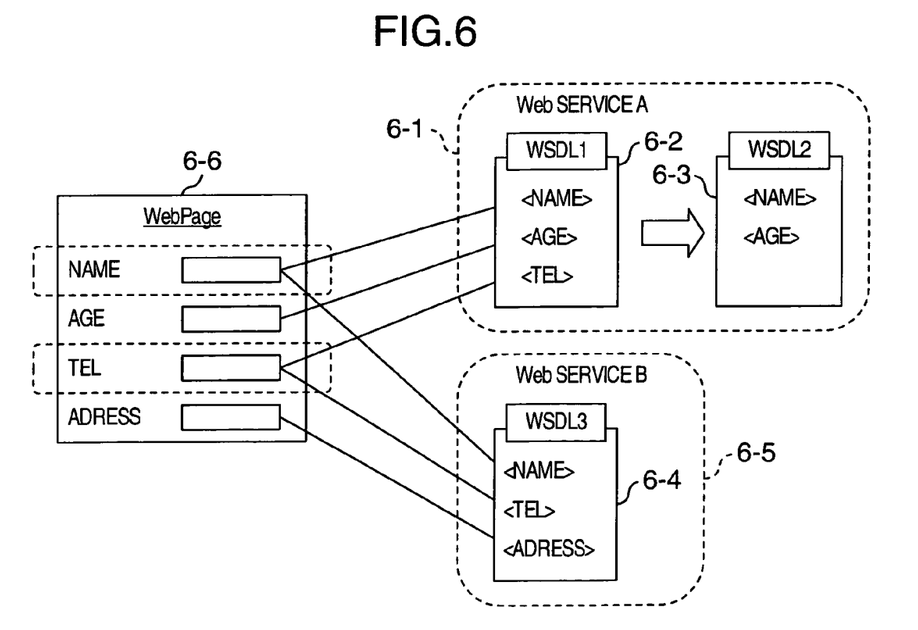
FIG. 6 is a diagram for illustratively indicating a changing example as to a WSDL file during connections to a plurality of web services by the web service client of the embodiment 2.

FIG. 6 is a diagram for illustratively showing a changing example of a WSDL file when the web service client of this embodiment 2 is connected to a plurality of web services. In this stage, as indicated in FIG. 6, in such a case that WSDL1 is changed into WSDL2, which correspond to an interface of a web service, a problem will be firstly explained which is caused when a client program is automatically corrected/changed in connection with the above-explained changes in the WSDLs.

In the case that the above-described automatic changing operation is carried out, similar to the above-explained embodiment 1, the change in the WSDLs is detected from a fault message. Then, if a difference is acquired between the WSDL1 before correction and the WSDL2 after correction, then it can be understood that a TEL tag has been deleted in this embodiment 2.

Figure 7:
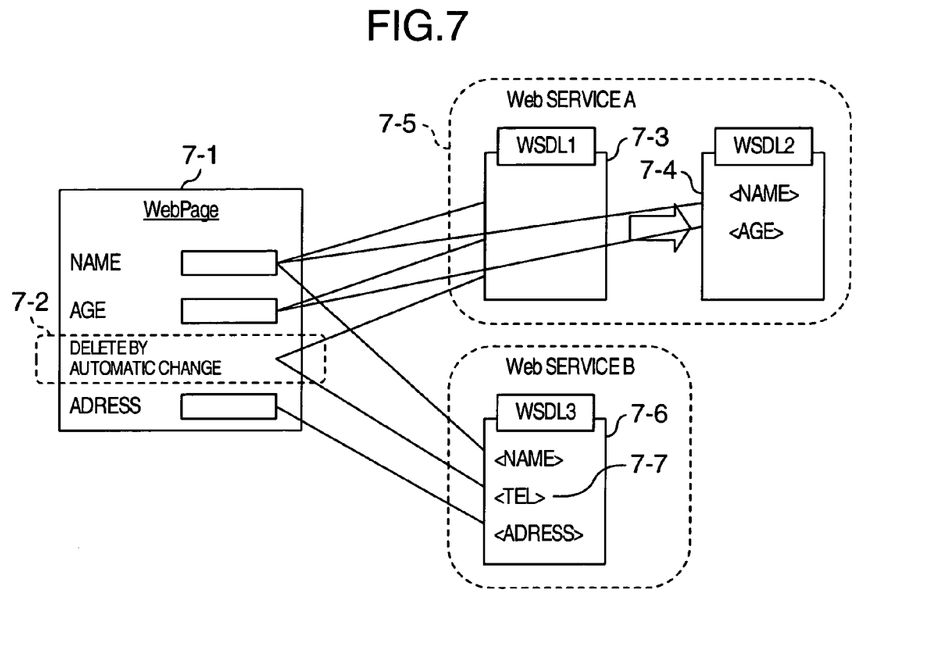
FIG. 7 is a diagram for illustratively showing a changing example as to a web page, which is caused by changing the WSDL file of the embodiment 2.

As a result, since a partial component of the client program is corrected, as represented in FIG. 7, a portion of "TEL" is deleted from a webPage which indicates a TEL form.

FIG. 7 is a diagram for illustratively showing a changing example of a web page in connection with a change in the WSDL file of this embodiment 2. In the changing example of FIG. 7, a portion of "TEL" has been deleted from a webPage which indicates a TEL form.

Figure 8:
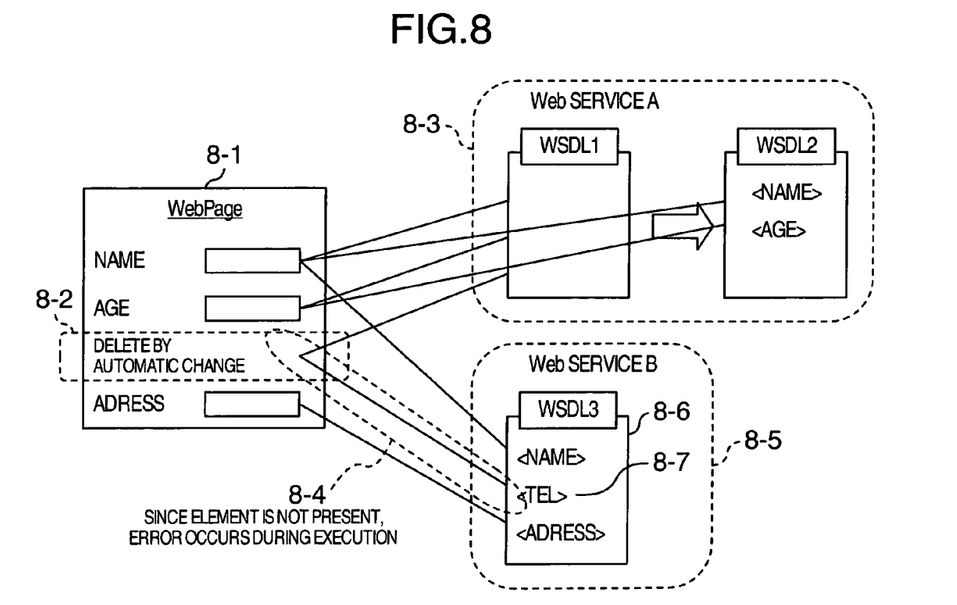
FIG. 8 is a diagram for illustratively indicating an occurrence example of an error which is caused by changing the web page of the embodiment 2.

However, the TEL form corresponds to such an element which also utilizes the web service B, and thus, may cause an error when the web service B is executed (FIG. 8).

FIG. 8 is a diagram for illustratively representing an occurrence example of an error, which is caused by changing the web page of this embodiment 2. As shown in FIG. 8, when the web service B is executed, since the TEL element is not present, an error happens to occur during the execution of this web service B. As a consequence, a WSDL3 of the web service B must be reconsidered so as to correct a component.

Figure 9:
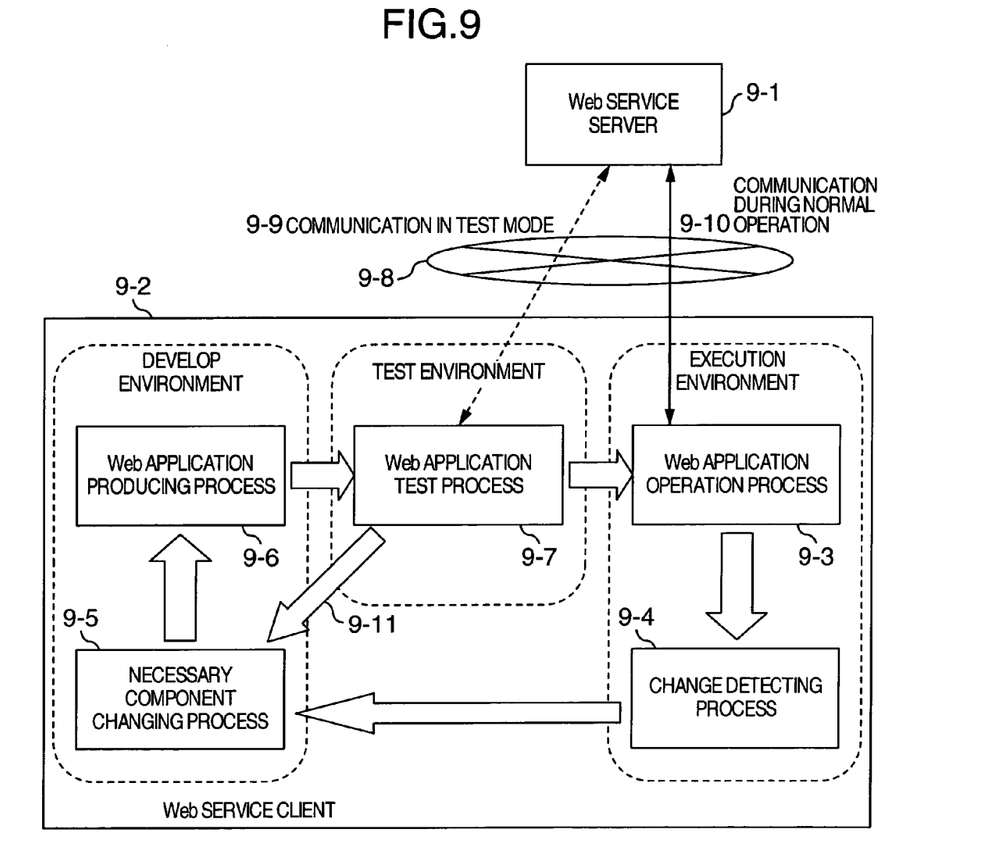
FIG. 9 is a diagram for schematically representing an outline of process operations of a program managing apparatus of the embodiment 2.

FIG. 9 is a diagram for schematically representing an outline of process operations of the program managing apparatus of the embodiment 2. Referring now to FIG. 9, the outline of the process operations of this embodiment 2 for solving the above-described problem will be described. It should be noted that although this embodiment 2 describes a program as a subject, this embodiment 2 may be alternatively applied also to an object.

The normal operation is carried out by way of a SOAP message communication between a web service server 9-1 and a web application operating process 9-3 on a web service client 9-2 (9-10). It should also be understood that the client apparatus and the server apparatus shown this drawing may be alternatively substituted by either a computer and an information processing apparatus, or a program and an object which execute the above-explained process operations.

In this stage, in the web service server 9-1, in the case that WSDL corresponding to an interface of a web service is changed into the other WSDL as shown in FIG. 6, since an interface of a SOAP message transmitted from the web service client 9-2 is different from the present interface, this web service server 9-1 returns therefrom a fault message.

When the web application operating process 9-3 provided on the side of the web service client 9-2 receives this fault message, a change in WSDL corresponding to the interface of the web service server 9-1 is sensed by a change sensing process 9-4 so as to specify a changed portion.

Next, a necessary component changing process 9-5 specifies a correction portion of a necessary component from the changed portion information of the specified WSDL, and thus, corrects/changes this specified correction portion of the necessary component.

Next, a web application producing process 9-6 reconstructs a client program of a web application which contains the changed component.

Then, a web application test process 9-7 transmits a SOAP message with respect to the web service server 9-1 by employing the produced web application (9-9).

In such a case that an error happens to occur during the execution at this stage, or a response of the SOAP message corresponds to a fault message, the process operation is again returned to the execution by the component changing process unit 9-5 (9-11). Then, the web application generating process 9-6 and the web application test process 9-7 are again carried out, and if the normal response is returned, then the process operation is advanced to the execution of the web application operation process 9-3 and the program managing apparatus restarts the operation thereof. In such a case that the normal response is not returned and also an unclear error occurs, the program managing apparatus notifies this fact to the manager and stops the operation thereof.

Figure 10:
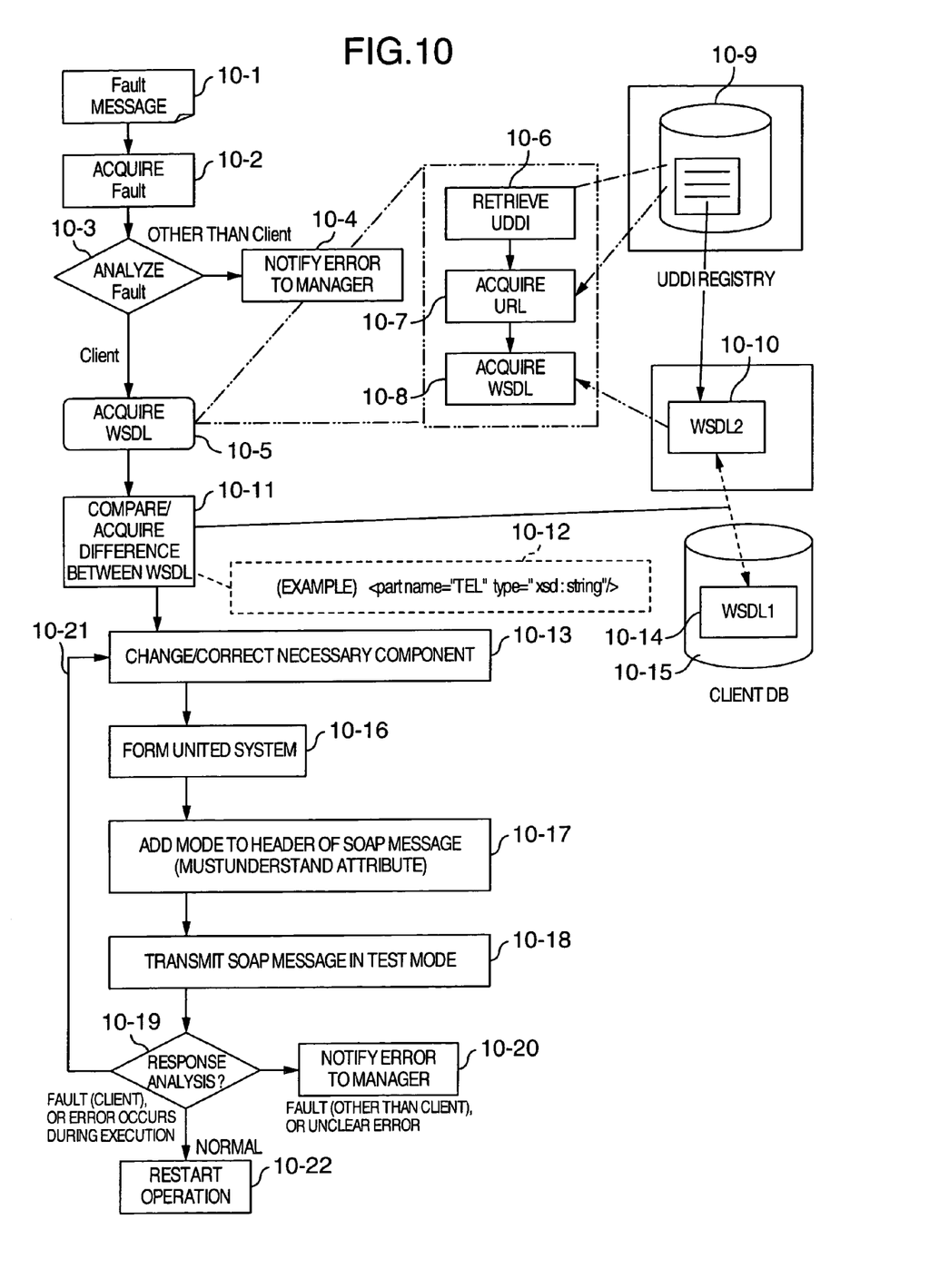
FIG. 10 is a diagram for indicating a detailed process operation executed on the side of a client program of the embodiment 2.

FIG. 10 is a diagram for illustratively representing a detailed process operation executed on the side of a client program of this embodiment 2. Referring now to a process flow chart of FIG. 10, the process operations executed on the side of the client program of this embodiment 21 will be described in detail.

When a web service client acquires a fault message 10-1 by a response sent from a web service server (10-2), the web service client firstly executes an analysis (10-3) of the fault message. In the analyzing operation (10-3) of the fault message, the web service client checks as to whether a content of a faultcode tag corresponds to "SOAP-ENV:Client", or other contents. When the content of the faultcode tag corresponds to "SOAP-ENV:Client", the web service client acquires WSDL (10-5), whereas when the content of the faultcode tag corresponds to other contents, the web service client stops the operation of the web application, displays an error screen with respect to a user, and also, performs an error notification to a manager (10-4).

In an acquisition (10-5) of WSDL, a web service is retrieved (10-6) in a UDDI (Universal Description, Discovery, and Integration) registry 10-9 by employing a web service retrieve condition which has been previously stored in a client DB10-15 (10-6), and storage place information as to WSDL after correction is acquired (10-7). In an acquisition (10-8) of WSDL, the web service client access a URL (Uniform Resource Locator) of the acquired storage place information so as to acquire the corrected WSDL.

In a WSDL comparing/difference acquisition (10-11), a WSDL2 (10-10) after correction which has been acquired is compared with a WSDL1 (10-14) before correction which has been stored in the client DB, and a difference between them is acquired. In the case of this embodiment 2, such a difference as indicated in an example 10-12 is acquired. The web service client discriminates a tag ("TEL" in this example) which will be added from the acquired difference, sets a null character string (" ") as this tag content (10-23), and then determines such a component which is to be changed and corrected, and thus, changes/corrects the necessary component (10-13).

While this necessary component is changed/corrected, the web server client executes changing/correcting operations in such a manner that the TEL portion is deleted as represented in FIG. 7 with respect to, for example, both a component in which a tag for indicating a TEL form on a webPage is produced, and another component in which a SOAP message to the web service server is produced.

In a united system forming operation 10-16, all of components which contain the changed/corrected components are again compiled, and a web application is reconstructed.

Next, the SOAP message is transmitted in a test mode. This test-mode transmission of the SOAP message is carried out in the below-mentioned manner.

That is, a Mode tag is added to a Header of the SOAP message (10-16). In this case, an attribute of the Mode tag is set to a misunderstand attribute (10-17), and in such a case that the web service server cannot understand the Mode tag, it is so set that an error is returned by the web service server. Also, it is so assumed that the content of the Mode tag is "TEST." In this embodiment 2, it is so assumed that the web service server also owns such a function capable of interpreting this Header; in the case that a content of a Mode tag corresponds to "TEST", the web service server is operated in the test mode, and checks as to whether or not a SOAP message transmitted from a client side corresponds to the normal input while does not execute an actual reservation and/or an actual order; and then, the web service server returns a response of a check result to the client.

Next, the changed SOAP message is transmitted to the web service server (10-18). In a response analysis 10-19, the web service client analyzes this response, or performs an error analysis in such a case that a transmission of a SOAP message fails which is caused by the error occurred during the execution.

In the case that the normal response is returned from the web service server, the web service client restarts the operation at once (10-22). Also, in the case that the error happens to occur during the execution, or a faultcode corresponds to "SOAP-ENV:Client", the process operation is again returned to the changing/correcting operation of the necessary component (10-21). In the case of any errors other than the above-explained cases, the web service client notifies an error content to the manager, and stop the operation thereof (10-20).

In the case that the necessary component is again changed/corrected, for example, the web service client corrects the component for producing the tag used to be displayed on the webPage and changes this component in such a manner that the necessary TEL portion is displayed in the web service B where the above-explained error has occurred. Also, the web service client changes such a component for producing the SOAP message to the web service server in such a manner that the TEL portion is contained only in the SOAP message to the web service B.

Figure 11:
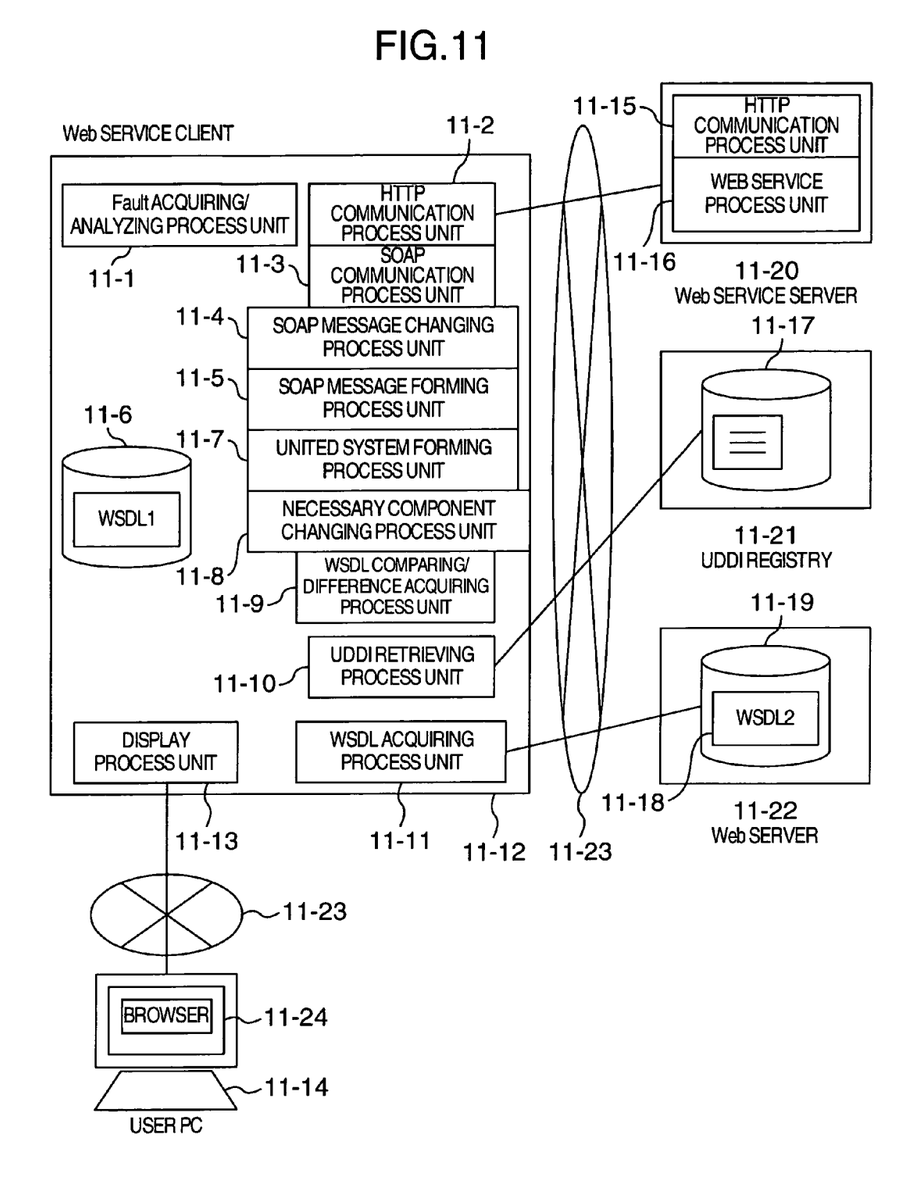
FIG. 11 is a diagram for schematically indicating a system structure of the program managing apparatus of the embodiment 2.

FIG. 11 is a diagram for schematically showing a system structure of the program managing apparatus according to this embodiment 2. Both the system structure and respective process operations will now be explained with reference to FIG. 11 and FIG. 10.

In FIG. 11, a web service client 11-12, a web service server 11-20, a UDDI registry 11-21, a web server 11-22, and a user PC 11-14 correspond to computers which are connected to a network 11-23.

Although the present invention does not specify a communication means between the server and the client, this embodiment 2 will now be explained based upon such an initial condition that a communication operation is carried out between the server and the client by employing the HTTP (Hyper Text Transfer Protocol) on the Internet. In other words, it is so assumed that while the web service client 11-12 owns such a function as an HTTP server, the user PC 11-14 is communicated via a web browser 11-24 to the web service client 11-12.

Also, it is so assumed that while the web service server 11-20 owns a function as an HTTP server, this web service server 11-20 is communicated to the web service client 11-12 by using a SOAP message; and while the UDDI registry 11-21 is equipped with an HTTP server, this UDDI registry 11-21 is communicated to the web service client 11-12 by employing a SOAP message.

The web service client 11-12 holds a database 11-6 which stores thereinto WSDL before correction and WSDL after connection. Also, this web service client 11-12 holds an HTTP communication processing unit 11-2, a SOAP communication processing unit 11-3, a SOAP message changing process unit 11-4, a SOAP message forming process unit 11-5, a united system forming process unit 11-7, a necessary component changing process unit 11-8, a WSDL comparing/difference-acquiring process unit 11-8, a UDDI retrieving process unit 11-20, a WSDL acquiring process unit 11-11, a fault acquiring/analyzing process unit 11-1, and also, a display process unit 11-13 on a memory thereof.

It is so assumed that after such a program for causing the web service client 11-12 to function as the respective processing units is recorded on a recording medium such as a CD-ROM and is stored in a magnetic disk, this program is loaded to the memory so as to be executed. It should also be noted that the recording medium for recording thereon the above-explained program may be alternatively realized by any recording medium other than this CD-ROM. Alternatively, the above-described program may be installed from this recording medium into the information processing apparatus, and the web service client 11-12 may access via a network to this recording medium so as to use this program.

The HTTP communication processing unit 11-2 executes a communication operation in accordance with the HTTP protocol. The SOAP communication processing unit 11-3 transmits and receives a SOAP message containing a test mode (10-17). The fault acquiring/analyzing process unit 11-1 acquires a fault message (10-2) and analyzes a fault message (10-3). The SOAP message changing process unit 11-4 adds a Header element (10-17). The SOAP message forming process unit 11-5 receives via the display process unit 11-13, such a data which is entered from the browser of the user PC 11-14, and then forms a SOAP message.

The united system forming process unit 11-17 again compiles all of components and reconstructs a web application (10-16). The necessary component changing process unit 11-8 changes and corrects a necessary component (10-13). The WSDL comparing/difference-acquiring process unit 11-9 performs a comparing/difference-acquiring operation of WSDLs (10-11).

The UDDI retrieving process unit 11-10 executes a retrieving operation of the UDDI registry (10-6). The WSDL acquiring process unit 11-11 performs an acquiring operation of WSDL (10-5). The display processing unit 11-13 displays a web page on the browser of the user PC, and receives an input from the browser, and then supplies the received input to the SOAP message forming process unit 11-5.

Next, the web service server 11-20 holds an HTTP communication processing unit 11-15, and a web service processing unit 11-16 on a memory thereof. The HTTP communication processing unit 11-15 performs a communication operation based upon the HTTP protocol. The web service processing unit 11-16 receives a SOAP message sent from the web service client 11-12, and then provides a web service. The UDDI registry 11-21 holds such an information related to web services such as WSDL holding places in a DB 11-19. The web server 11-22 stores the information as to WSDL in another DB 11-19.

As previously described, in accordance with the program managing apparatus according to this embodiment 2, when the error happens to occur which is caused by that the interface definition information is changed, the program is changed in order to be adapted to the changed content of this interface definition information, and then, the access request is transmitted in the test mode. As a result, in such a case that the error occurs which is caused by changing the interface definition information, the correcting operation and the test operation can be carried in a dynamic manner, which are required so as to prevent recurring of this error.

In accordance with the present invention, in such a case that the error occurs which is caused by changing the interface definition information, the correcting operation and the test operation can be carried in a dynamic manner, which are required so as to prevent recurring of this error.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A program managing method in a web service system for providing a web service for testing a message which has been changed in response to a change made in interface definition information, comprising:
   judging as to whether or not an error occurs when an access request made by a message is transmitted, which is caused by the change of the interface definition information indicative of an interface of a destination of said access request;
   changing said message in correspondence with a content of said changed interface definition information in the case that the error occurs which is caused by the change of the interface definition information;
   transmitting an access request made by said changed message in a test mode; and
   a changed portion of said message is detected by comparing the interface definition information before correction with the interface definition information after correction.

2. A program managing method in a web service system for providing a web service for testing a message which has been changed in response to a change made in interface definition information, comprising:
   judging as to whether or not an error occurs when an access request made by a message is transmitted, which is caused by the change of the interface definition information indicative of an interface of a destination of said access request;
   changing said message in correspondence with a content of said changed interface definition information in the case that the error occurs which is caused by the change of the interface definition information;
   transmitting an access request made by said changed message in a test mode; and
   said access request is transmitted in the test mode by adding information indicative of a transmission test of a message to a header of said changed message, thereby transmitting said resultant message in which said information has been added to the header thereof.

3. A program managing method in a web service system for providing a web service for testing a program which has been changed in response to a change made in interface definition information, comprising:
   judging as to whether or not an error occurs when an access request made by a message is transmitted, which is caused by the change of the interface definition information indicative of an interface of a destination of said access request;
   changing an interface of a program for issuing said access request in correspondence with a content of the changed interface definition information in the case that the error occurs which is caused by the change of the interface definition information;
   transmitting an access request made by said changed program in a test mode; and
   said access request is transmitted in the test mode by adding information indicative of a transmission test of a message to a header of a message which is outputted from said changed program, thereby transmitting said resultant message in which said information has been added to the header thereof.

4. A program managing method in a web service system for providing a web service for testing a program which has been changed in response to a change made in interface definition information, comprising:

judging as to whether or not an error occurs when an access request made by a message is transmitted, which is caused by the change of the interface definition information indicative of an interface of a destination of said access request;

changing an interface of a program for issuing said access request in correspondence with a content of the changed interface definition information in the case that the error occurs which is caused by the change of the interface definition information;

transmitting an access request made by said changed program in a test mode; and in the case that an error occurs in the test transmission of said access request, changing of said program is again carried out.

5. A machine-readable medium containing at least one sequence of instructions to effect a program managing method in a web service system for providing a web service for testing a message which has been changed in response to a change made in interface definition information, wherein the at least one sequence of instructions, when executed, causes a machine to:

judge as to whether or not an error occurs when an access request made by a message is transmitted, which is caused by the change of the interface definition information indicative of an interface of a destination of said access request;

change said message in correspondence with a content of said changed interface definition information in the case that the error occurs which is caused by the change of the interface definition information;

transmit an access request made by said changed message in a test mode; and detect a changed portion of said message by comparing the interface definition information before correction with the interface definition information after correction.

6. A machine-readable medium containing at least one sequence of instructions to effect a program managing method in a web service system for providing a web service for testing a message which has been changed in response to a change made in interface definition information, wherein the at least one sequence of instructions, when executed, causes a machine to:

judge as to whether or not an error occurs when an access request made by a message is transmitted, which is caused by the change of the interface definition information indicative of an interface of a destination of said access request;

change said message in correspondence with a content of said changed interface definition information in the case that the error occurs which is caused by the change of the interface definition information;

transmit an access request made by said changed message in a test mode; and wherein said access request is transmitted in the test mode by adding information indicative of a transmission test of a message to a header of said changed message, thereby transmitting said resultant message in which said information has been added to the header thereof.

7. A machine-readable medium containing at least one sequence of instructions to effect a program managing method in a web service system for providing a web service for testing a message which has been changed in response to a change made in interface definition information, wherein the at least one sequence of instructions, when executed, causes a machine to:

judge as to whether or not an error occurs when an access request made by a message is transmitted, which is caused by the change of the interface definition information indicative of an interface of a destination of said access request;

change an interface of a program for issuing said access request in correspondence with a content of the changed interface definition information in the case that the error occurs which is caused by the change of the interface definition information;

transmit an access request made by said changed program in a test mode; and wherein said access request is transmitted in the test mode by adding information indicative of a transmission test of a message to a header of a program which is outputted from said changed program, thereby transmitting said resultant message in which said information has been added to the header thereof.

8. A machine-readable medium containing at least one sequence of instructions to effect a program managing method in a web service system for providing a web service for testing a program which has been changed in response to a change made in interface definition information, wherein the at least one sequence of instructions, when executed, causes a machine to:

judge as to whether or not an error occurs when an access request made by a message is transmitted, which is caused by the change of the interface definition information indicative of an interface of a destination of said access request;

change an interface of a program for issuing said access request in correspondence with a content of the changed interface definition information in the case that the error occurs which is caused by the change of the interface definition information;

transmit an access request made by said changed program in a test mode; and in the case that an error occurs in the test transmission of said access request, change of said program is again carried out.

9. A computer-readable medium having a managing program adapted for use in a web service system for providing a web service for testing a message which has been changed in response to a change made in interface definition information, the program, when implemented, effecting units comprising:

an error detector unit adapted to judge as to whether or not an error occurs when an access request made by a message is transmitted, which is caused by the change of the interface definition information indicative of an interface of a destination of said access request;

a message changer unit adapted to change said message in correspondence with a content of said changed interface definition information in the case that the error occurs which is caused by the change of the interface definition information;

a transmitter adapted to transmit an access request made by said changed message in a test mode; and a change detector unit adapted to detect a changed portion of said message by comparing the interface definition information before correction with the interface definition information after correction.

10. A computer-readable medium having a managing program adapted for use in a web service system for providing a web service for testing a message which has been changed in response to a change made in interface definition information, the program, when implemented, effecting units comprising:
- an error detector unit adapted to judge as to whether or not an error occurs when an access request made by a message is transmitted, which is caused by the change of the interface definition information indicative of an interface of a destination of said access request;
- a message changer unit adapted to change said message in correspondence with a content of said changed interface definition information in the case that the error occurs which is caused by the change of the interface definition information;
- a transmitter adapted to transmit an access request made by said changed message in a test mode; and
- wherein said access request is transmitted in the test mode by adding information indicative of a transmission test of a message to a header of said changed message, thereby transmitting said resultant message in which said information has been added to the header thereof.

11. A computer-readable medium having a managing program adapted for use in a web service system for providing a web service for testing a message which has been changed in response to a change made in interface definition information, the program, when implemented, effecting units comprising:
- an error detector unit adapted to judge as to whether or not an error occurs when an access request made by a message is transmitted, which is caused by the change of the interface definition information indicative of an interface of a destination of said access request;
- an interface changer unit adapted to change an interface of a program for issuing said access request in correspondence with a content of the changed interface definition information in the case that the error occurs which is caused by the change of the interface definition information;
- a transmitter adapted to transmit an access request made by said changed program in a test mode; and
- wherein said access request is transmitted in the test mode by adding information indicative of a transmission test of a message to a header of a program which is outputted from said changed program, thereby transmitting said resultant message in which said information has been added to the header thereof.

12. A computer-readable medium having a managing program adapted for use in a web service system for providing a web service for testing a message which has been changed in response to a change made in interface definition information, the program, when implemented, effecting units comprising:
- an error detector unit adapted to judge as to whether or not an error occurs when an access request made by a message is transmitted, which is caused by the change of the interface definition information indicative of an interface of a destination of said access request;
- an interface changer unit adapted to change an interface of a program for issuing said access request in correspondence with a content of the changed interface definition information in the case that the error occurs which is caused by the change of the interface definition information;
- a transmitter adapted to transmit an access request made by said changed program in a test mode; and
- in the case that an error occurs in the test transmission of said access request, change of said program is again carried out.

* * * * *